United States Patent
Tabatowski-Bush et al.

(10) Patent No.: US 10,549,643 B2
(45) Date of Patent: Feb. 4, 2020

(54) CONTROLLED PRE-CHARGE CIRCUIT ARRANGEMENT

(71) Applicant: FORD GLOBAL TECHNOLOGIES, LLC, Dearborn, MI (US)

(72) Inventors: Benjamin A. Tabatowski-Bush, South Lyon, MI (US); Arnold Kweku Mensah-Brown, Canton, MI (US); Wesley Edward Burkman, Dearborn, MI (US); Robert Bolduc, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 510 days.

(21) Appl. No.: 15/232,554

(22) Filed: Aug. 9, 2016

(65) Prior Publication Data
US 2018/0043783 A1 Feb. 15, 2018

(51) Int. Cl.
 *B60L 11/18* (2006.01)
(52) U.S. Cl.
 CPC .............................. *B60L 11/1803* (2013.01)
(58) Field of Classification Search
 None
 See application file for complete search history.

(56) References Cited

U.S. PATENT DOCUMENTS

| | | | |
|---|---|---|---|
| 7,304,402 B2 * | 12/2007 | Osawa | B60L 3/0046 307/10.1 |
| 8,203,810 B2 | 6/2012 | Bryan et al. | |
| 8,884,309 B2 | 11/2014 | Miura | |
| 2005/0219162 A1 | 10/2005 | Tsuge | |
| 2013/0119903 A1 | 5/2013 | Weiss et al. | |
| 2013/0169038 A1 * | 7/2013 | King | B60L 58/18 307/10.1 |
| 2015/0219706 A1 * | 8/2015 | Loftus | B60L 3/0069 324/503 |
| 2015/0229123 A1 | 8/2015 | Ngo | |
| 2015/0251542 A1 * | 9/2015 | Mensah-Brown | B60L 11/005 307/10.1 |
| 2015/0256112 A1 | 9/2015 | Weiss et al. | |
| 2016/0211691 A1 | 7/2016 | Chen et al. | |
| 2016/0362004 A1 * | 12/2016 | Einhorn | B60L 3/0069 |
| 2018/0134169 A1 * | 5/2018 | Loftus | B60L 11/1853 |

* cited by examiner

*Primary Examiner* — Jared Fureman
*Assistant Examiner* — Aqeel H Bukhari
(74) *Attorney, Agent, or Firm* — David B. Kelley; Brooks Kushman P.C.

(57) ABSTRACT

A vehicle system includes a relay and coil of a contactor. The relay is configured to transfer current between a traction battery and an electrical load when closed. The system also includes a controller configured to operate a switch such that current flow from the traction battery through the coil and switch, and bypassing the relay, causes the relay to close to permit pre-charging of the load.

17 Claims, 4 Drawing Sheets

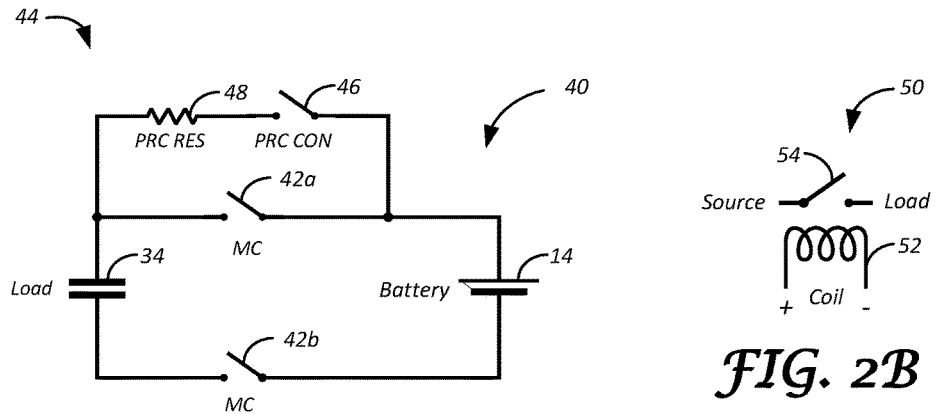
FIG. 2A
FIG. 2B
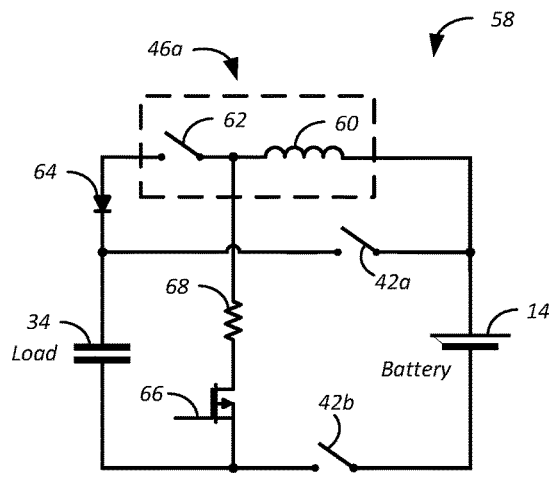
FIG. 3
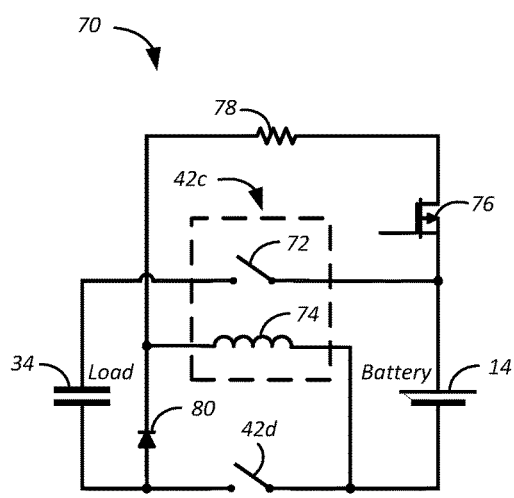
FIG. 4

CONTROLLED PRE-CHARGE CIRCUIT ARRANGEMENT

TECHNICAL FIELD

The present disclosure relates to systems and methods for arranging one or more components in a circuit for controlling pre-charge of an electrical load.

BACKGROUND

A hybrid or an electric vehicle may be equipped with at least one traction battery configured to provide energy for propulsion. The traction battery may also provide energy for other vehicle electrical systems. For example, the traction battery may transfer energy to high voltage loads, such as compressors and electric heaters. In another example, the traction battery may provide energy to low voltage loads, such as an auxiliary 12V battery.

SUMMARY

A vehicle system includes a relay and coil of a contactor, the relay configured to transfer current between a traction battery and an electrical load when closed, and a controller configured to operate a switch such that current flow from the traction battery through the coil and switch, and bypassing the relay, causes the relay to close to permit pre-charging of the load.

A system for a traction battery includes a contactor including a coil and relay connected in series, the relay configured to close in response to a magnitude of current through the coil being greater than a first threshold, and a controller configured to, responsive to a pre-charge request, enable current from the battery to flow through the coil and bypass the relay such that a magnitude of the current from the battery is less than a second threshold greater than the first prior to the relay closing to pre-charge an electrical load.

A method for a traction battery includes, in response to receiving a pre-charge request, by a controller, selectively enabling current from the battery to flow through a coil of a contactor and to bypass a relay of the contactor prior to closing of the relay to permit pre-charging of a load to a first threshold.

BRIEF DESCRIPTION OF THE DRAWINGS

FIG. 2A is a schematic diagram illustrating an arrangement for pre-charging an electrical load;

FIG. 2B is a schematic diagram illustrating a contactor;

FIG. 3 is a schematic diagram illustrating a controlled pre-charge circuit arrangement using a pre-charge contactor coil as a pre-charge resistor;

FIG. 4 is a schematic diagram illustrating a controlled pre-charge circuit arrangement using a main contactor coil to pre-charge a load;

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
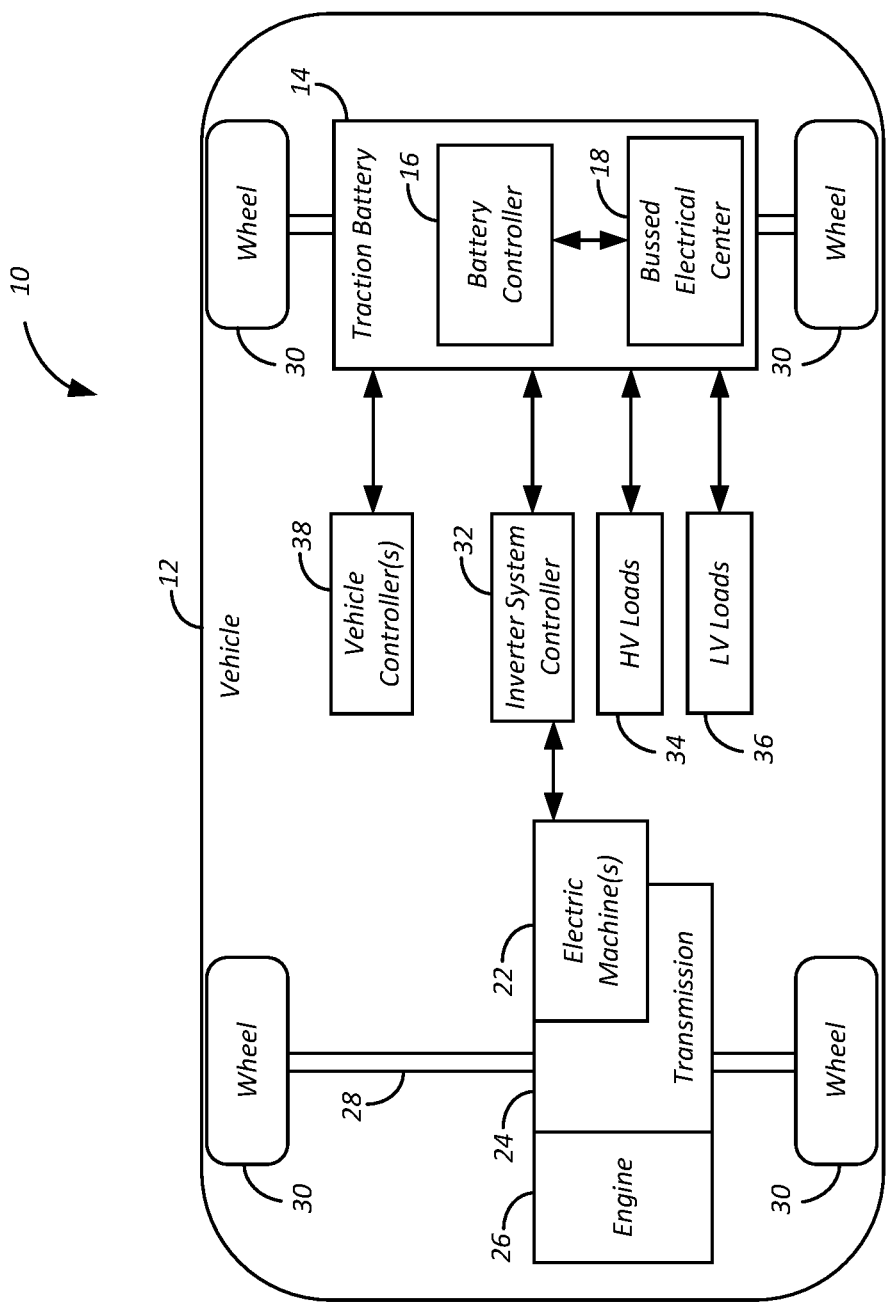
FIG. 1 is a block diagram of hybrid electric vehicle (HEV) illustrating a typical drivetrain and energy storage components.

FIG. 1 depicts an example hybrid-electric vehicle (HEV) system 10. A hybrid-electric vehicle 12, hereinafter vehicle 12, may comprise at least one traction battery 14. The traction battery 14 may include a battery controller 16 and may be configured to receive electric charge via a charging session at a charging station connected to a power source. In one example, the power source may include a device that harnesses renewable energy, such as a photovoltaic (PV) solar panel, or a wind turbine.

The traction battery 14 may comprise one or more battery cells (not shown), e.g., electrochemical cells, capacitors, or other types of energy storage device implementations. The battery cells may be arranged in any suitable configuration, such as, but not limited to, in series and in parallel, and configured to receive and store electric energy for use in operation of the vehicle 12. Each cell may provide a same or different nominal threshold of voltage. The battery cells may be further arranged into one or more arrays, sections, or modules further connected in series or in parallel.

The traction battery 14 further comprises a bussed electrical center (BEC) 18 electrically connected to the battery cells, e.g., such as via positive and negative battery terminals. The BEC 18 may include a plurality of connectors and switches enabling the supply and withdrawal of electric energy to and from the battery cells of the traction battery 14. In one example, the BEC 18 may be electrically connected with the battery controller 16 and may be configured to receive one or more commands, signals, or other notifications from the battery controller 16 indicative of a request to operate the one or more of the plurality of connectors and switches.

The battery controller 16 is electrically connected with the BEC 18 and controls the energy flow between the BEC 18 and the battery cells. For example, the battery controller 16 may be configured to monitor and manage temperature and state of charge of each of the battery cells. The battery controller 16 may, in one instance, command the BEC 18 to operate one or more of the plurality of switches in response to temperature or state of charge in a given battery cell reaching a predefined threshold. In another example, the battery controller 16 may be in communication with one or more vehicle controllers 38, such as, but not limited to, an engine controller (ECM) and transmission controller (TCM), and may command the BEC 18 to operate one or more of the plurality of switches in response to a predetermined signal from the one or more vehicle controllers 38.

The vehicle 12 may further comprise one or more electric machines 22 mechanically connected to a hybrid transmission 24. The electric machines 22 may be capable of operating as a motor or a generator. In addition, the hybrid transmission 24 may be mechanically connected to an engine 26. The hybrid transmission 24 is also mechanically connected to a drive shaft 28 that is mechanically connected to wheels 30.

The electric machines 22 can provide propulsion and deceleration capability when the engine 26 is turned on or off using energy stored in the traction battery 14, such as via the BEC 18. The electric machines 22 also act as generators and can provide fuel economy benefits by recovering energy that would normally be lost as heat in the friction braking system. The electric machines 22 may also provide reduced pollutant emissions since the vehicle 12 may be operated in electric mode under certain conditions.

The traction battery 14 typically provides a high voltage DC output. The BEC 18 of the traction battery 14 may be electrically connected to an inverter system controller (ISC) 32. The ISC 32 is electrically connected to the electric machines 22 and provides the ability to bi-directionally transfer energy, such as via the BEC 18, between the traction battery 14 and the electric machines 22. In one example, the electric machines 22 and other components of the vehicle 12 supplying and/or receiving energy to and from the traction battery 14 may define a main load 34 of the traction battery 14.

In a motor mode, the ISC 32 may convert the DC output provided by the traction battery 14 to a three-phase alternating current (AC) as may be required for proper functionality of the electric machines 22. In a regenerative mode, the ISC 32 may convert the three-phase AC output from the electric machines 22 acting as generators to DC input required by the traction battery 14. While FIG. 1 depicts a typical hybrid electric vehicle, the description herein is equally applicable to a pure electric vehicle. For a pure electric vehicle, e.g., battery electric vehicle (BEV), the hybrid transmission 24 may be a gear box connected to the electric machines 22 and the engine 26 may not be present. In one example, a main load 34 of the traction battery 14 in the BEV may include the electric machines 22 and the gear box.

In addition to providing energy for propulsion, the traction battery 14 may provide energy for other vehicle electrical systems (shown generally as auxiliary loads 36). For example, the traction battery 14 may transfer energy to high voltage loads, such as compressors and electric heaters. In another example, the traction battery 14 may provide energy to low voltage loads, such as an auxiliary 12V battery. In such an example, the vehicle 12 may include a DC/DC converter module (not shown) that converts the high voltage DC output of the traction battery 14 to a low voltage DC supply that is compatible with the low voltage loads. The various components discussed may have one or more associated controllers to control and monitor the operation of the components. The controllers may communicate via a serial bus (e.g., Controller Area Network (CAN)) or via discrete conductors.

Referring now to FIG. 2A, an example arrangement 40 of the BEC 18 for energy transfer between the traction battery 14 and the main load (indicated generally using a capacitor symbol) 34 is shown. The arrangement 40 may include a pair of contactors 42a, 42b, such as a positive main contactor and a negative main contactor, electrically connected to corresponding terminals of the traction battery 14. In one example, closing the contactors 42a, 42b completes a circuit between the main load 34 and the traction battery 14 allowing the flow of electric energy between the traction battery 14 and the main load 34. In another example, opening one or more of the contactors 42a, 42b opens the circuit between the main load 34 and the traction battery 14 stopping the flow of energy between them. In one instance, the battery controller 16 may command the BEC 18 to open or close one or more of the contactors 42a, 42b in response to receiving a signal from the one or more vehicle controllers 38, e.g., ECM, TCM, and so on, indicative of a request to initiate or terminate transfer of electric energy between the main load 34 and the traction battery 14.

The arrangement 40 may further comprise a pre-charge circuit 44 configured to control an energizing process of the main load 34. The pre-charge circuit 44 may include a pre-charge contactor 46 connected in series with a pre-charge resistor 48. The pre-charge circuit 44 may be electrically connected in parallel with the contactor 42a, such that when the contactor 42a is open, and the pre-charge contactor 46 and the contactor 42b are closed, electric current may flow through the pre-charge circuit 44 providing controlled energizing of the terminal of the main load 34 that is connected with the contactor 42a.

In one example, the battery controller 16 may be configured to initiate a pre-charge procedure using the pre-charge circuit 44 in response to receiving a signal indicative of a request to close the contactors 42a, 42b. The battery controller 16 may, for example, issue one or more commands to the BEC 18 to close the contactor 42b and to close the pre-charge contactor 46 and control current flow toward the terminal of the traction battery 14 in connection with the contactor 42a.

The battery controller 16 may be also configured to terminate the pre-charge procedure in response to voltage across the open contactor, e.g., the contactor 42a, being greater than a predefined threshold. The battery controller 16 may be further configured to command the BEC 18 to close the contactor 42a in response to voltage across the open contactor 42a being lower than a predefined threshold.

As shown in FIG. 2B, each of the contactors 42a, 42b and the pre-charge contactor 46 may define an electro-mechanical device 50 comprising an inductive coil 52 and a relay 54. In one example, energizing the inductive coil 52 using a predefined amount of current, e.g., pull-in current $I_{pull\_in}$, causes the relay 54 to close and de-energizing the inductive coil 52, e.g., providing amount of current less than drop-out current $I_{drop\_out}$, causes the relay 54 to open. In another example, following the closing of the relay 54, the electro-mechanical device 50 may be configured to conduct a predefined amount of current, e.g., hold current $I_{hold}$, through the inductive coil 52 to keep the relay 54 in a closed position.

In one instance, pull-in current $I_{pull\_in}$ may be larger than hold current $I_{hold}$ and larger than drop-out current $I_{drop\_out}$. In such an instance, hold current $I_{hold}$ may be larger than drop-out current $I_{drop\_out}$. A value of pull-in current $I_{pull\_in}$ may, for example, be 1.7 amperes (A) with a corresponding value of hold current $I_{hold}$ being 0.4 A and a corresponding value of drop-out current $I_{drop\_out}$ being 0.1 A. Values of pull-in current $I_{pull\_in}$, hold current $I_{hold}$, and drop-out current $I_{drop\_out}$ for a given contactor may be a function of one or more device characteristics, such as, but not limited to, design and manufacturer specifications, manufacturing methods and materials, testing, contactor age and/or cycling count, and so on.

In reference to FIG. 3, an exemplary arrangement 58 for controlling a pre-charge of the main load 34 is shown. As described in reference to FIG. 2A, the battery controller 16 may initiate a procedure for pre-charging the main load 34 in response to receiving a request to transfer energy between the traction battery 14 and the main load 34 or another signal indicative of a request to close the contactors 42a, 42b. Responsive to the request, the battery controller 16 may issue a command to close the contactor 42b. The battery controller 16 may be configured to pre-charge the main load 34 using one or more active and/or passive circuit components, such as, but not limited to, a pre-charge contactor 46a, a diode 64, a switch 66 and a resistor 68.

The pre-charge contactor 46a may include a pre-charge contactor coil 60 and a pre-charge contactor relay 62 as was described, for example, in reference to the electro-mechanical device 50 illustrated in FIG. 2B. In one example, the pre-charge contactor coil 60 and the pre-charge contactor relay 62 may be connected in series, such as via an external and/or an internal coupling of one or more corresponding electrical leads. A series connection between the pre-charge contactor coil 60 and the pre-charge contactor relay 62 may enable a controlled pre-charge of the main load 34.

Supplying power to the pre-charge contactor coil 60 may cause the pre-charge contactor coil 60 to conduct current $I_{coil}$ in one or more portions of the exemplary arrangement 58, e.g., due to an intrinsic resistance of the pre-charge contactor coil 60. The pre-charge contactor relay 62 may be configured to close, thus beginning a pre-charge of the main load 34, in response to current $I_{coil}$ through the pre-charge contactor coil 60 being greater than a predefined threshold. In one example, the pre-charge contactor relay 62 may be configured to close in response to current $I_{coil}$ flowing through the pre-charge contactor coil 60 being greater than pull-in current $I_{pull\_in}$.

The switch 66, e.g., when in a closed state, may be electrically connecting the pre-charge contactor 46a to the traction battery 14 enabling the pre-charge contactor 46a to be selectively powered using high-voltage (HV) power using, for example, DC output of the traction battery 14. In response to a predefined signal or request, the battery controller 16 may be configured to selectively close the switch 66 to complete the electrical circuit directing power to the pre-charge contactor coil 60 of the pre-charge contactor 46a and bypassing the pre-charge contactor relay 62 of the pre-charge contactor 46a. In one example, the battery controller 16 may issue a command to close the switch 66 in response to receiving a signal indicative of a request to close the contactors 42a, 42b. The diode 64 may be configured to connect the main load 34 to the pre-charge contactor 46a and may be configured to prevent a reverse current flow into the traction battery 14.

In one instance, performance of the pre-charge contactor relay 62 may be affected in response to current flowing through one or more portions of the exemplary arrangement 58, such as through the pre-charge contactor coil 60, being greater than a predefined threshold, e.g., greater than upper-bound current $I_{upper\_bound}$, where upper-bound current $I_{upper\_bound}$ is greater than pull-in current $I_{pull\_in}$. The resistor 68 may be arranged with the pre-charge contactor coil 60 and the pre-charge contactor relay 62 of the pre-charge contactor 46a to reduce current flow through one or more portions of the exemplary arrangement 58 to be less than a predefined threshold, e.g., upper-bound current $I_{upper\_bound}$. The resistor 68 may be arranged, for example, to reduce current through the pre-charge contactor coil 60 to be less than upper-bound current $I_{upper\_bound}$. In another example, the resistor 68 may be arranged with the pre-charge contactor coil 60 and the pre-charge contactor relay 62 of the pre-charge contactor 46a to maintain current flow through one or more portions of the exemplary arrangement 58 being greater than a predefined threshold, e.g., pull-in current $I_{pull\_in}$. The resistor 68 may be arranged, in one instance, to maintain current flow through the pre-charge contactor coil 60 being greater than pull-in current $I_{pull\_in}$.

Following the closing of the pre-charge contactor relay 62 the exemplary arrangement 58 may initiate a first stage of pre-charging the main load 34, e.g., a first of a plurality of stages of a pre-charging process. The first stage of pre-charging the main load 34 may include pre-charging the main load 34 to a predefined threshold, such as to voltage greater than or equal to voltage drop across the bypass path, e.g., the current path including the pre-charge contactor coil 60 and the switch 66 and excluding the pre-charge contactor relay 62. The battery controller 16 may be configured to determine whether the first stage of pre-charging the main load 34 has been completed. In one example, the battery controller 16 may determine whether the first stage of pre-charging the main load 34 has been completed based on voltage across the open contactor 42a. The battery controller 16 may, in one instance, determine that the first stage of pre-charging the main load 34 has been completed in response to voltage across the open contactor 42a being less than a predefined threshold, e.g., less than voltage drop across the resistor 68.

The battery controller 16 may be further configured to, responsive to determining that the first stage of pre-charging the main load 34 has been completed, issue one or more commands to open the switch 66. Opening of the switch 66 may increase current flow through the pre-charge contactor relay 62 and may thus initiate a second stage of pre-charging the main load 34. The second stage of pre-charging the main load 34 may include pre-charging the main load to a predefined threshold, such as to voltage less than or equal to voltage across the traction battery 14. As with the first stage of pre-charging the main load 34, the battery controller 16 may determine whether the second stage of pre-charging the main load 34 is completed based, for example, on voltage across the open contactor 42a. The battery controller 16 may issue one or more commands to close the contactor 42a in response to determining the second stage of pre-charging the main load 34 is completed, e.g., in response to determining that voltage across the open contactor 42a is less than a predefined threshold. In one example, completion of the second stage of pre-charging of the main load 34 may be indicative of pre-charge completion.

In reference to FIG. 4, an exemplary arrangement 70 for controlling a pre-charge of the main load 34 is shown. The contactors 42c, 42d, when closed, may be configured to connect the traction battery 14 and the main load 34 thus enabling a transfer of electrical power, e.g., via electrical current flow, between the two systems. The battery controller 16 may initiate pre-charging of the main load 34 in response to receiving a request to transfer energy between the traction battery 14 and the main load 34 or another signal indicative of a request to close the contactors 42c, 42d. A diode 80 may be configured to connect the main load 34 to the contactor 42c and may be configured to prevent a reverse current flow into the traction battery 14.

In initiating pre-charging of the main load 34 the battery controller 16 may issue a command to close a switch 76 and initiate current flow from the traction battery 14 to a contactor coil 74 of the contactor 42c. A contactor relay 72 of the contactor 42c may be configured to close, thus beginning a pre-charge of the main load 34, in response to current $I_{coil}$ through the contactor coil 74 being greater than a predefined threshold. In one example, the contactor relay 72 may be configured to close in response to current $I_{coil}$ flowing through the contactor coil 74 being greater than pull-in current $I_{pull\_in}$.

In one instance, performance of the contactor relay 72 may be affected in response to current flowing through one or more portions of the exemplary arrangement 70, such as through the contactor coil 74, being greater than a predefined threshold, e.g., greater than upper-bound current $I_{upper\_bound}$, where upper-bound current $I_{upper\_bound}$ is greater than pull-in current $I_{pull\_in}$. The resistor 78 may be arranged with the contactor coil 74 and the contactor relay 72 of the contactor 42c to reduce current flow through one or more portions of the exemplary arrangement 70 to be less than a predefined threshold, e.g., upper-bound current $I_{upper\_bound}$. The resistor 78 may be arranged, for example, to reduce current through the contactor coil 74 to be less than upper-bound current $I_{upper\_bound}$. In another example, the resistor 78 may be arranged with the contactor coil 74 and the contactor relay 72 of the contactor 42c to maintain current flow through one or more portions of the exemplary arrangement 70 being greater than a predefined threshold, e.g., pull-in current $I_{pull\_in}$. The resistor 78 may be arranged, in one instance, to maintain current flow through the contactor coil 74 being greater than pull-in current $I_{pull\_in}$.

Following the closing of the contactor relay 72 the exemplary arrangement 70 may initiate a first stage of pre-charging the main load 34, e.g., a first of a plurality of stages of a pre-charging process. The first stage of pre-charging the main load 34 may include pre-charging the main load 34 to a predefined threshold, such as to voltage greater than or equal to voltage drop across the bypass path, e.g., the current path including the switch 76 and the contactor coil 74 and excluding the contactor relay 72. The battery controller 16 may be configured to determine whether the first stage of pre-charging the main load 34 has been completed. In one example, the battery controller 16 may determine whether the first stage of pre-charging the main load 34 has been completed based on voltage across one or more of the contactors 42c, 42d. The battery controller 16 may, in one instance, determine that the first stage of pre-charging the main load 34 has been completed in response to voltage across one or more of the contactors 42c, 42d being less than a predefined threshold, e.g., less than voltage drop across the resistor 78.

The battery controller 16 may be further configured to, responsive to determining that the first stage of pre-charging the main load 34 has been completed, issue one or more commands to open the switch 76. Opening of the switch 76 may increase current flow through the contactor relay 72 and may thus initiate a second stage of pre-charging the main load 34. The second stage of pre-charging the main load 34 may include pre-charging the main load to a predefined threshold, such as to voltage less than or equal to voltage across the traction battery 14. As with the first stage of pre-charging the main load 34, the battery controller 16 may determine whether the second stage of pre-charging the main load 34 is completed based, for example, on voltage across one or more of the contactor 42c, 42d. In response to determining that the second stage of pre-charging the main load 34 has been completed, the battery controller 16 may issue one or more commands to operate the switch 76 at a predefined duty cycle, e.g., such that current flowing through the contactor coil 74 is greater than hold current $I_{hold}$. The battery controller 16 may further issue one or more commands to close the contactor 42d in response to determining the second stage of pre-charging the main load 34 is completed, e.g., in response to determining that voltage across the contactor 42d is less than a predefined threshold. In one example, completion of the second stage of pre-charging of the main load 34 may be indicative of pre-charge completion.

Figure 5:
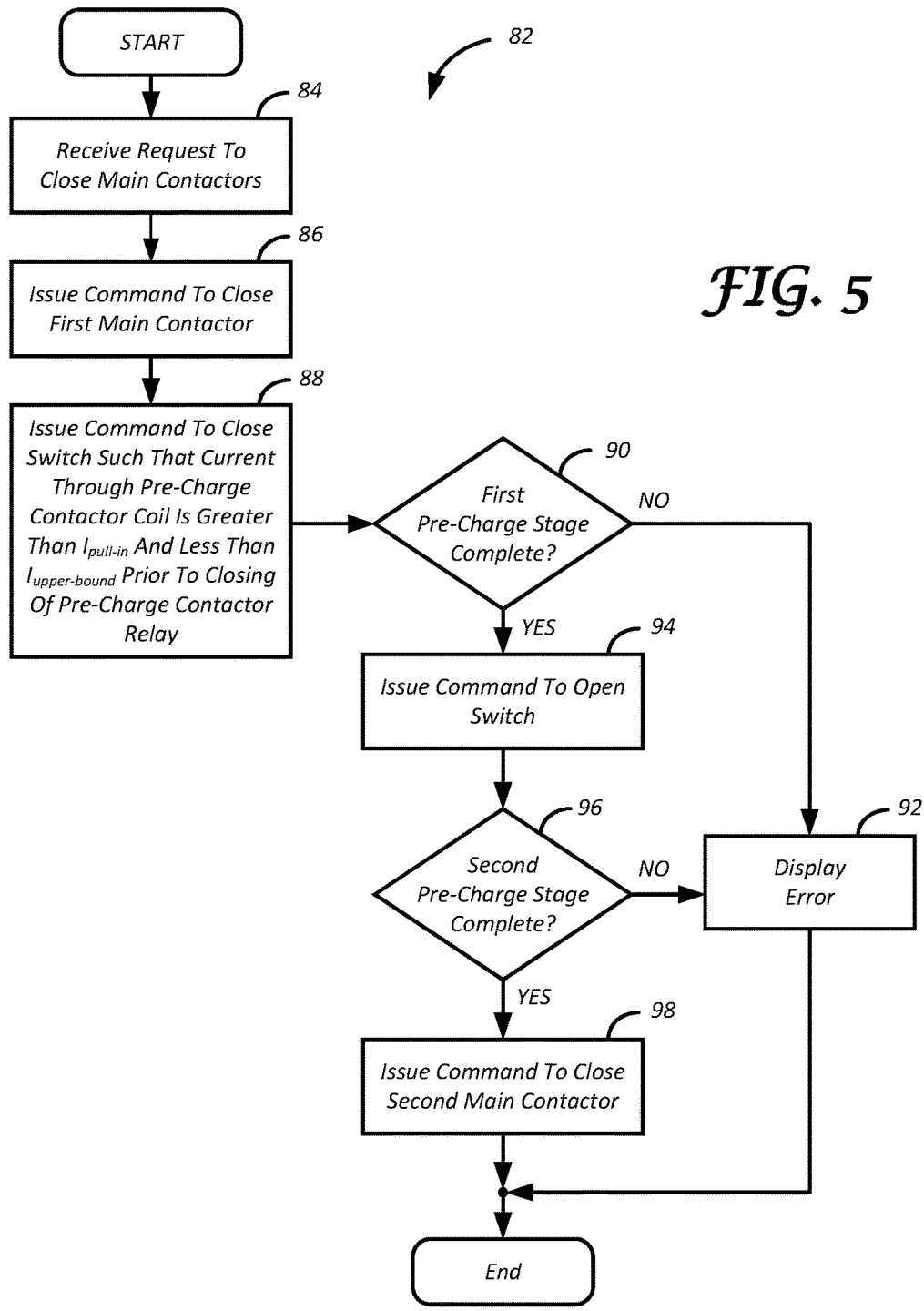
FIG. 5 is a flowchart illustrating an algorithm for controlling pre-charge of the load using a pre-charge contactor coil as a pre-charge resistor.

In reference to FIG. 5, an example process 82 for controlling a pre-charge of the main load 34 is shown. The process 82 may begin at block 84 where the battery controller 16 receives a signal indicative of a request to close the contactors 42a, 42b. In response to the request, the battery controller 16 may begin a process for pre-charging the main load 34. In one example, the battery controller 16 may at block 86 issue a command to close the contactor 42b.

At block 88 the battery controller 16 may issue a command to close the switch 66 thus directing current to the pre-charge contactor coil 60 of the pre-charge contactor 46a and the resistor 68. Current $I_{coil}$ flowing through the pre-charge contactor coil 60 that is greater than pull-in current $I_{pull\_in}$ may cause the pre-charge contactor relay 62 to close, thus beginning a pre-charge of the main load 34. The resistor 68 arranged with the pre-charge contactor coil 60 and the pre-charge contactor relay 62 of the pre-charge contactor 46a may reduce current through the pre-charge contactor coil 60 to be less than upper-bound current $I_{upper\_bound}$ and may further maintain current $I_{coil}$ flowing through the pre-charge contactor coil 60 being greater than pull-in current $I_{pull\_in}$, where upper-bound current $I_{upper\_bound}$ is greater than pull-in current $I_{pull\_in}$.

Following closing of the pre-charge contactor relay 62 that may initiate a first stage of pre-charging the main load 34, the battery controller 16 may be configured to at block 90 determine whether the first stage of pre-charging the main load 34 has been completed, such as based on voltage across the open contactor 42a. In one example, the battery controller 16 may measure voltage across the open contactor 42a for a predefined period of time and/or a predefined number of times prior to determining whether a pre-charge of the main load 34 has been completed. At block 92 the battery controller 16 may issue a diagnostic message in response to determining at block 90 that the first stage of pre-charging the main load 34 has not been completed, e.g., voltage across the open contactor 42a is greater than a voltage drop across the resistor 68 after a predefined period of time.

In response to determining at block 90 that the first stage of pre-charging the main load 34 has been completed, the battery controller 16 may at block 94 issue a command to open the switch 66 initiating a second stage of pre-charging the main load 34. At block 96 the battery controller 16 may be configured to determine whether the second stage of pre-charging the main load 34 has been completed, such as based on voltage across the open contactor 42a after a predefined period of time. At block 92 the battery controller 16 may issue a diagnostic message in response to determining at block 96 that the second stage of pre-charging the main load 34 has not been completed, e.g., voltage across the open contactor 42a is greater than a predefined threshold after a predefined period of time.

In response to determining at block 96 that the second stage of pre-charging the main load 34 has been completed, the battery controller 16 may at block 98 issue one or more commands to close the contactor 42a. The battery controller 16 may, in one instance, determine that a pre-charge of the main load 34 has been completed in response to voltage across the open contactor 42a being less than a predefined threshold. The process 82 may then end. In some instances, the process 82 may be repeated in response to receiving a signal indicative of a request to close the contactors 42*a*, 42*b* or in response to another signal or request.

Figure 6:
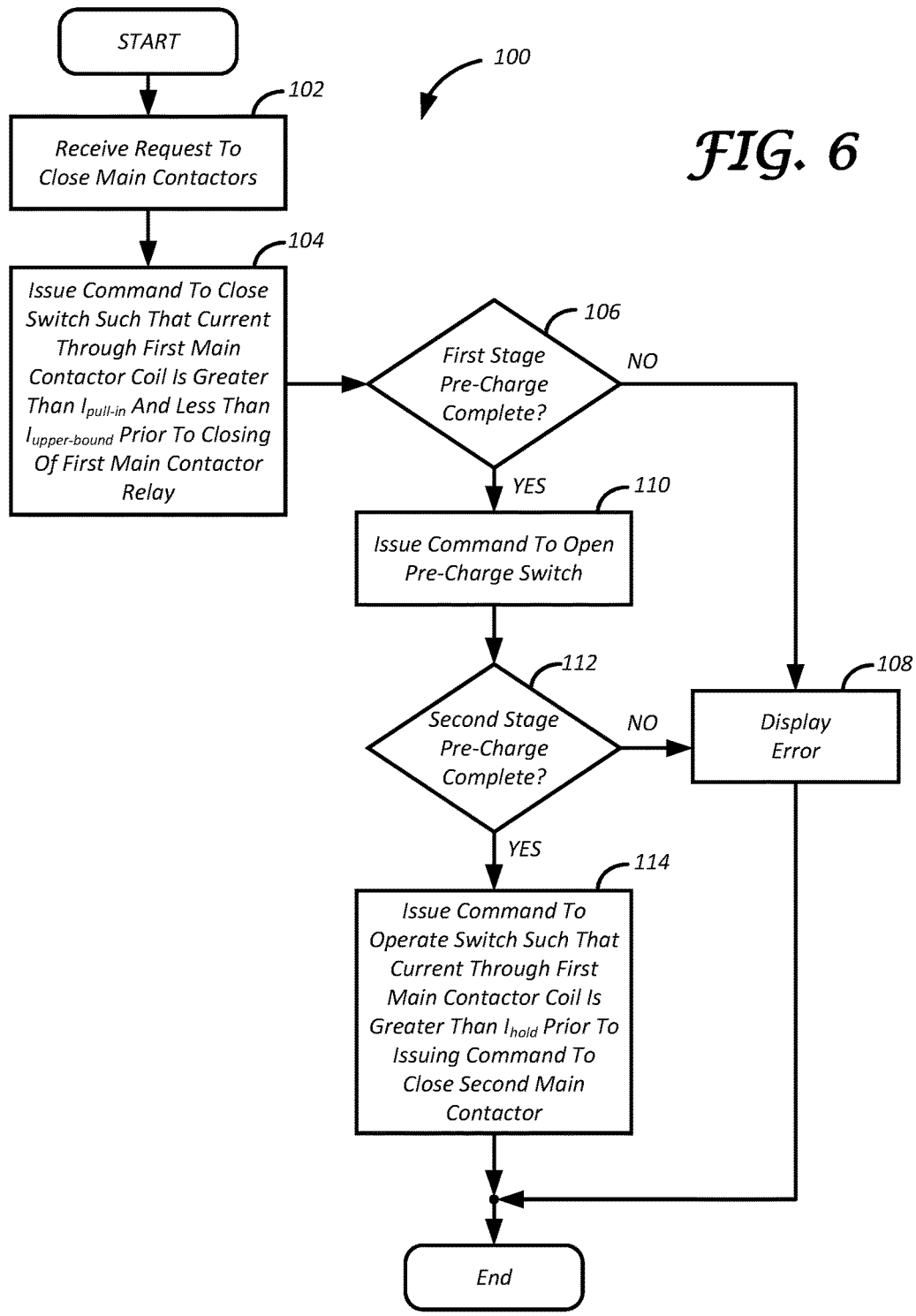
FIG. 6 is a flowchart illustrating an algorithm for controlling pre-charge of the load using a main contactor coil.

In reference to FIG. 6, an example process 100 for controlling a pre-charge of the main load 34 is shown. The process 100 may begin at block 102 where the battery controller 16 receives a signal indicative of a request to close the contactors 42*c*, 42*d*. In response to the request, the battery controller 16 may begin a process for pre-charging the main load 34. In one example, the battery controller 16 may at block 104 issue a command to close the switch 76 thus directing power to the contactor coil 74 of the contactor 42*c* and the resistor 78. In one example, supplying power to the contactor coil 74 and the resistor 78 may cause the contactor coil 74 to conduct current $I_{coil}$. Current $I_{coil}$ flowing through the pre-charge contactor coil 60 that is greater than pull-in current $I_{pull\_in}$ may cause the contactor relay 72 to close, thus beginning a pre-charge of the main load 34. The resistor 78 arranged with the contactor coil 74 and the contactor relay 72 of the contactor 42*c* may reduce current through the contactor coil 74 to be less than upper-bound current $I_{upper\_bound}$ and may further maintain current $I_{coil}$ flowing through the contactor coil 74 being greater than pull-in current $I_{pull\_in}$, where upper-bound current $I_{upper\_bound}$ is greater than pull-in current $I_{pull\_in}$.

Following closing of the contactor relay 72 that may initiate a first stage of pre-charging the main load 34, the battery controller 16 may be configured to at block 106 determine whether the first stage of pre-charging the main load 34 has been completed, such as based on voltage across the contactor 42*d*. In one example, the battery controller 16 may measure voltage across the contactor 42*d* for a predefined period of time and/or a predefined number of times prior to determining whether a pre-charge of the main load 34 has been completed. At block 108 the battery controller 16 may issue a diagnostic message in response to determining at block 106 that the first stage of pre-charging the main load 34 has not been completed, e.g., voltage across the open contactor 42*d* is greater than a voltage drop across the resistor 78 after a predefined period of time.

In response to determining at block 106 that the first stage of pre-charging the main load 34 has been completed, e.g., voltage across the open contactor 42*d* is equal to a voltage drop across the resistor 78, the battery controller 16 may at block 110 issue a command to open the switch 76 initiating a second stage of pre-charging the main load 34. At block 112 the battery controller 16 may be configured to determine whether the second stage of pre-charging the main load 34 has been completed, such as based on voltage across the contactor 42*d* after a predefined period of time. At block 108 the battery controller 16 may issue a diagnostic message in response to determining at block 112 that the second stage of pre-charging the main load 34 has not been completed, e.g., voltage across the contactor 42*d* is greater than a predefined threshold after a predefined period of time.

In response to determining at block 112 that the second stage of pre-charging the main load 34 has been completed, e.g., voltage across the contactor 42*d* is less than a predefined threshold, the battery controller 16 may at block 114 issue one or more commands to operate the switch 76 such that current flowing through the contactor coil 74 is greater than hold current $I_{hold}$. The battery controller 16 may further issue a command to close the contactor 42*d*. The process 100 may then end. In some instances, the process 100 may be repeated in response to receiving a signal indicative of a request to close the contactors 42*c*, 42*d* or in response to another signal or request.

The processes, methods, or algorithms disclosed herein may be deliverable to or implemented by a processing device, controller, or computer, which may include any existing programmable electronic control unit or dedicated electronic control unit. Similarly, the processes, methods, or algorithms may be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms may also be implemented in a software executable object. Alternatively, the processes, methods, or algorithms may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle system comprising:
    a contactor including a relay and coil, the relay configured to transfer current between a traction battery and an electrical load when closed; and
    a controller configured to operate a switch such that current flow from the traction battery through the coil and switch, and bypassing the relay, causes the relay to close to permit pre-charging of the load.

2. The system of claim 1, wherein the relay and coil are connected in series and define a pre-charge contactor configured to open responsive to pre-charge completion.

3. The system of claim 1, wherein the relay and coil define a main contactor configured to remain closed responsive to pre-charge completion.

4. The system of claim 1, wherein the controller is further configured to operate the switch such that the causing of the relay to close permits pre-charging of the load to a first threshold, and to subsequently operate the switch to permit pre-charging of the load to a second threshold.

5. The system of claim 4, wherein the second threshold is greater than the first threshold.

6. The system of claim 4, wherein the first threshold corresponds to a voltage measured across a relay bypass path and wherein the second threshold corresponds to a voltage measured across the battery.

7. The system of claim 6, wherein pre-charging the load to a voltage measured across the battery is indicative of pre-charge completion.

8. The system of claim 1 further comprising a resistor connected with the relay and coil such that amount of current bypassing the relay is greater than a pull-in current that causes the relay to close and less than an upper-bound current that causes a temperature of the coil to exceed a predefined value.

9. A system for a traction battery comprising:
a contactor including a coil and relay connected in series, the relay configured to close in response to a magnitude of current through the coil being greater than a first threshold; and
a controller configured to, responsive to a pre-charge request, enable current from the battery to flow through the coil and bypass the relay such that a magnitude of the current from the battery is less than a second threshold greater than the first prior to the relay closing to pre-charge an electrical load.

10. The system of claim 9, wherein pre-charging the load includes causing a voltage of the load to correspond to a voltage across a relay bypass path.

11. The system of claim 9, wherein the controller is further configured to disable current flow through the coil and relay in response to a voltage of the load corresponding to a voltage of the battery.

12. A method for a traction battery comprising:
in response to receiving a pre-charge request, by a controller, selectively enabling current from the battery to flow through a coil of a contactor and to bypass a relay of the contactor prior to closing of the relay to permit pre-charging of a load to a first threshold voltage.

13. The method of claim 12 further comprising, responsive to the pre-charging of the load to the first threshold voltage, selectively enabling current from the battery to flow through the coil and relay to permit pre-charging of the load to a second threshold voltage greater than the first.

14. The method of claim 13, wherein the first threshold voltage corresponds to a voltage across a relay bypass path and the second threshold voltage corresponds to a voltage across the battery.

15. The method of claim 14, wherein the pre-charging the load to a voltage across the battery is indicative of pre-charge completion.

16. The method of claim 12, wherein the contactor is a pre-charge contactor configured to open in response to pre-charge completion.

17. The method of claim 12, wherein the contactor is a main contactor configured to remain closed following pre-charge completion to permit transfer of charge between the battery and the load.

* * * * *